Figure 5:
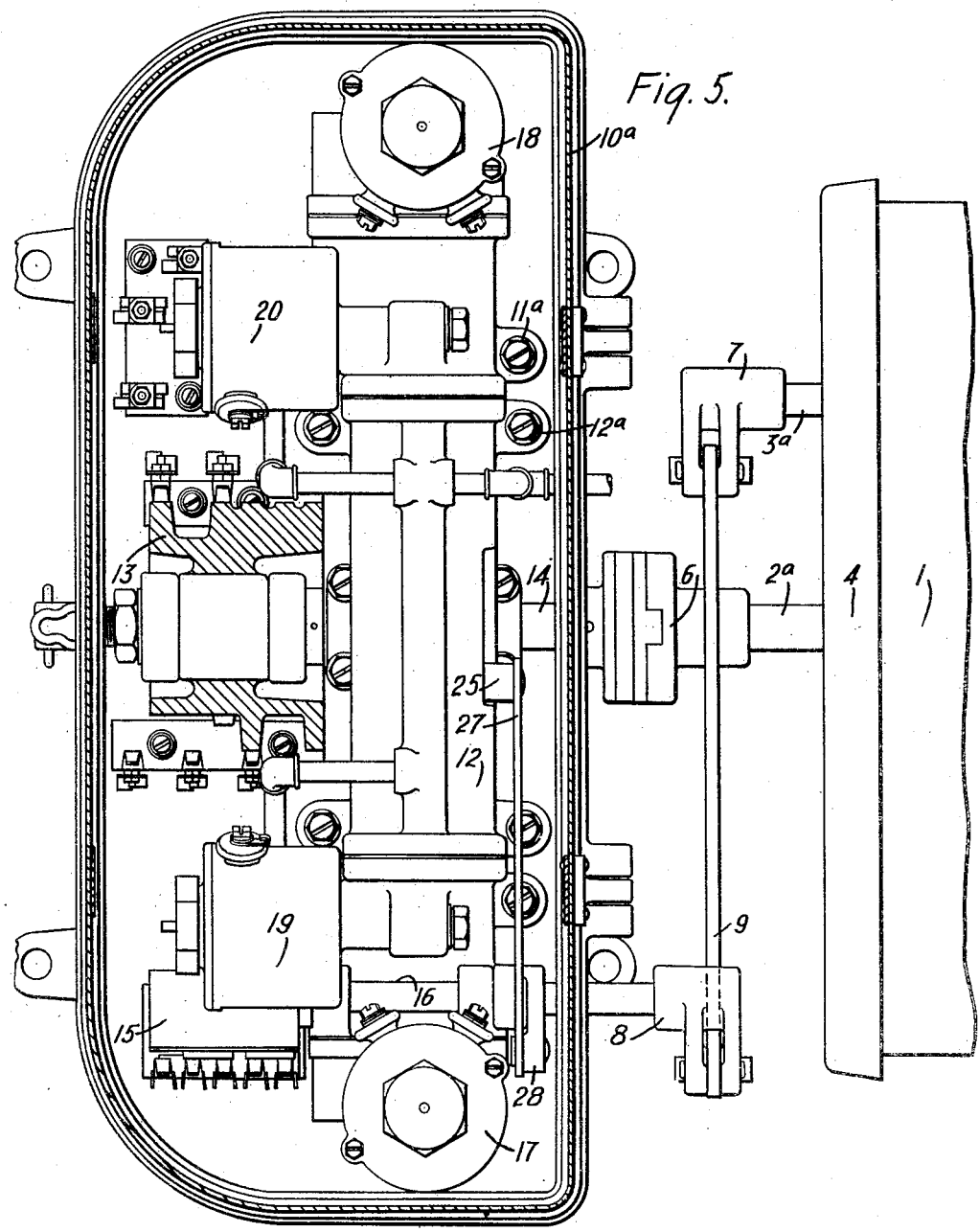

A. J. HALL.
CONTROL APPARATUS.
APPLICATION FILED OCT. 9, 1914.
1,244,491.
Patented Oct. 30, 1917.
3 SHEETS—SHEET 1.
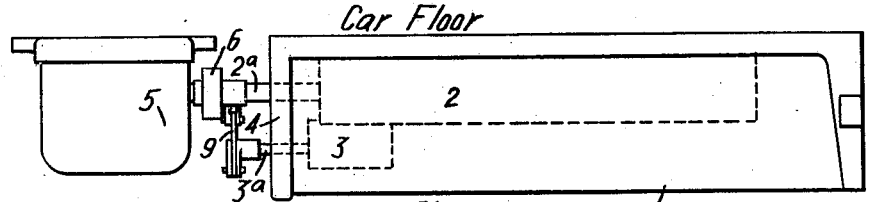
Fig. 1.
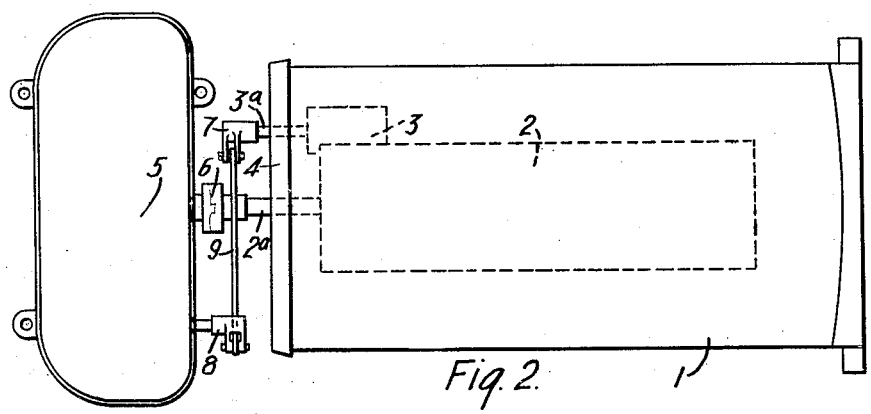
Fig. 2.
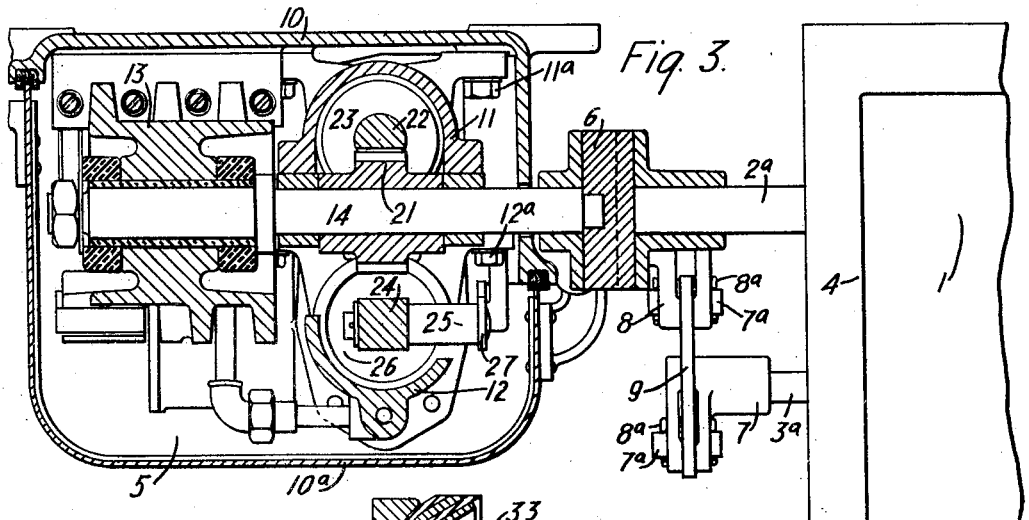
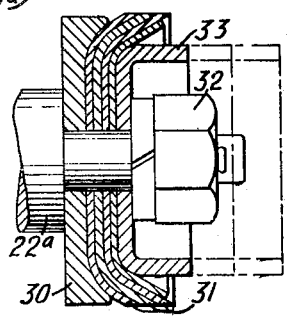
Fig. 4.
WITNESSES:
Fred A. Lind
W. R. Coley
INVENTOR
Arthur J. Hall
BY
ATTORNEY

A. J. HALL.
CONTROL APPARATUS.
APPLICATION FILED OCT. 9, 1914.

1,244,491.

Patented Oct. 30, 1917.
3 SHEETS—SHEET 2.

WITNESSES:
Fred A. Lind
W. R. Coley

INVENTOR
Arthur J. Hall
BY
ATTORNEY

A. J. HALL.
CONTROL APPARATUS.
APPLICATION FILED OCT. 9, 1914.

1,244,491.

Patented Oct. 30, 1917.
3 SHEETS—SHEET 3.

WITNESSES:
Fred. A. Lind
W. R. Coley

INVENTOR
Arthur J. Hall
BY
Chorley S. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,244,491.          Specification of Letters Patent.        Patented Oct. 30, 1917.

Application filed October 9, 1914. Serial No. 865,845.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Apparatus, of which the following is a specification.

My invention relates to control apparatus, and it has special reference to the remote control or automatic operation of controllers of the well-known "K" type or the like for electric railways vehicles.

One object of my invention is to provide a compact, durable and structurally independent controller-operating mechanism for the above-indicated purpose, whereby the usual form of drum or rotatable type of controllers may, without change, be readily and inexpensively associated with the mechanism.

Another object of my invention is to provide a mechanism of the above-indicated character which shall require relatively insignificant mechanical changes to adapt it for use with the various forms of drum-type controllers, that is, controllers having different total angular throws of the main drum and the reversing drum and different center distances between the two drums.

Another object of my invention is to provide means for permitting a slight deviation in the alinement of certain parts of the controller and operating mechanism, whereby the time and expense of installation may be reduced.

Heretofore, controller-operating mechanisms of the type in question have, in some cases, been unsymmetrically disposed with respect to the controller to be operated and have employed relatively non-compact and bulky apparatus; or, in the latter structures, have been permanently and non-adjustably incorporated with the main-drum and the reversing-drum shafts, so that expensive changes in the mechanical parts have been requisite when different forms of controllers were to be operated, these changes, in many instances, involving the use of new castings and thus entailing considerable expense. Moreover, some difficulty has been experienced in rapidly and accurately alining certain parts of the apparatus.

According to my present invention, I provide a practically universal operating mechanism for the well-known "K" controllers, or others of the drum or rotating type, which involves no changes whatever in the controllers themselves, which is rapidly and easily installed, and which requires very small and inexpensive changes in the parts of the mechanism to adapt it for use with a plurality of different forms of such controllers. To accomplish these ends, I provide a structurally independent operating mechanism having a plurality of auxiliary controller drums, a plurality of electrically-governed, fluid-pressure actuated pistons and coöperating cylinders for the drums, a flexible coupling for joining the main drum shaft and the substantially alined corresponding auxiliary drum, and a combination of crank-arms and links for connecting the reversing drum shaft and the corresponding parallel-extending auxiliary drum. The mechanism, as a whole, is disposed in substantially symmetrical relation to the controller to be operated, and all interconnecting mechanical means are wholly contained within the space between the mechanism and controller. By simply changing the effective length of the extennal link that connects the reversing drum and its corresponding auxiliary drum, and by varying the angular position of the reversing drum crank-arm relative to the "off" position of the drum, allowances may readily be made for different center distances between the drums and for different total angular throws of the reversing drum, respectively. Moreover, by associating an interchangeable stop member with the piston corresponding to the main drum, the piston stroke may be made of any desired length and, consequently, the total angular throw of the main drum may be easily regulated.

Figure 6:
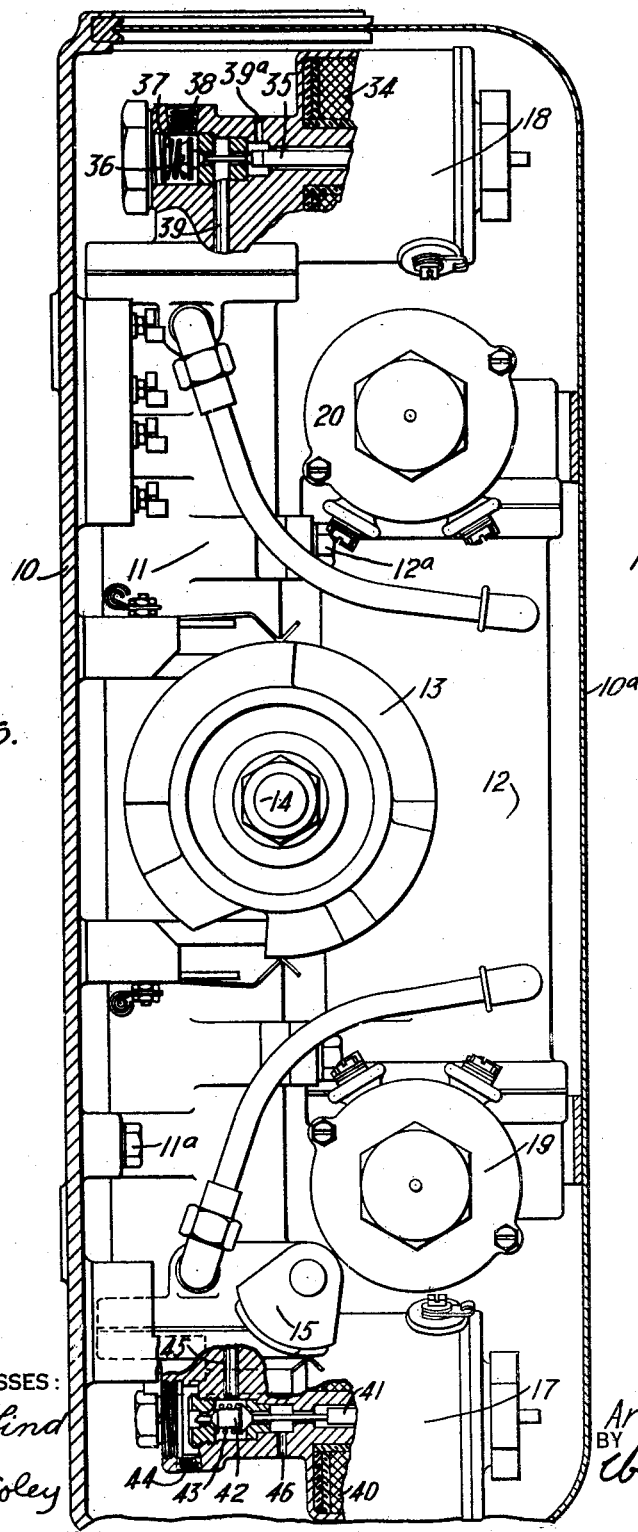
Figure 7:
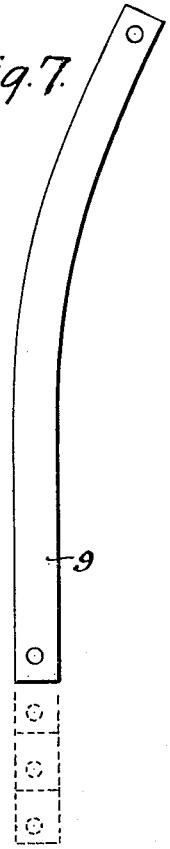

In the accompanying drawing, Figure 1 is an outline view, in side elevation, of a controller of the well-known "K" type and an operating mechanism therefor; Fig. 2 is a similar view, in front elevation, of the apparatus shown in Fig. 1; Fig. 3 is an enlarged cross sectional view of a portion of the apparatus illustrated in Fig. 1; Fig. 4 is a detail view, chiefly in section, of a portion of the structure shown in Fig. 3; Fig. 5 is an enlarged view, with the covers partially removed, of a portion of the apparatus illustrated in Fig. 2; Fig. 6 is a still further enlarged view of the apparatus shown in Fig. 5, taken at right angles to that figure; and Fig. 7 is a detail view of an intermediate operating connection shown in Fig. 1.

Referring to the drawing, the apparatus here shown comprises a controller 1 of the well-known "K" type which is preferably adapted for location beneath the car floor of an electric railway vehicle, and is provided with a main drum 2 and a reversing drum 3, of usual construction, and a top controller-cover member 4 of usual form, through which the main drum shaft 2$^a$ and the reversing drum shaft 3$^a$ respectively extend; an operating mechanism 5 for the controller which is also adapted for location beneath the car floor, and has a shaft member substantially alined with the main drum shaft 2$^a$ and associated therewith by means of a flexible coupling 6, and a set of mechanical members for connecting the reversing drum shaft 3$^a$ to a corresponding shaft member of the operating mechanism 5, the said set of members comprising a crank-arm 7 which is secured to the reversing drum shaft 3$^a$ and has a bifurcated end, a similar crank-arm 8 which is associated with the shaft member of the operating mechanism, and a link member 9 for suitably connecting the bifurcated ends of the crank-arms 7 and 8, bearing-pins 7$^a$ and cotter pins 8$^a$ being preferably employed for connection between the link and crank-arms. It will be observed that the entire mechanical interconnecting means is disposed substantially wholly within the bounding planes of both the controller 1 and the operating mechanism 5.

The flexible coupling 6 may be of any familiar type and is here shown as being of a well-known dovetail form, whereby positive rotational movement of the connecting parts is assured, while, at the same time, a certain degree of lateral movement is permitted, whereby it is not necessary to exactly aline the two shaft members to be connected.

The controller - operating mechanism 5 comprises a suitable base member 10; an incasing member 10$^a$; a cylinder casting 11 that corresponds to the main drum of the controller and may be secured to the base member 10 by means of a plurality of bolts 11$^a$; a second cylinder casting 12 that corresponds to the reversing drum of the controller and may be suitably fastened to the casting 11 through the agency of a plurality of bolts 12$^a$; a rotatable auxiliary control drum 13 which is suitably mounted upon a shaft 14 that is substantially alined with the main drum shaft 2$^a$ and is connected thereto by the flexible coupling 6; a second auxiliary control drum 15 that is disposed on the opposite side of the main drum shaft 2$^a$ from the reversing drum shaft 3$^a$, and is mounted upon a shaft 16, to the outer end of which the crank arm 8 is attached; a plurality of electrically-governed, fluid-pressure controlling valves 17 and 18 for the cylinder 11; and a plurality of magnet valves 19 and 20 of a similar type that are associated with the cylinder 12, as hereinafter more fully set forth.

The shaft 14 that is secured to the main drum shaft 2$^a$ is provided, at an intermediate point, with a pinion 21 that is adapted to mesh with a rack member 22, to the ends of which are secured pistons 23 which operate within the cylinder 11. In the cylinder 12, a piston rod 24 is loosely associated with an oscillating lever 25 and also has a plurality of pistons 26 secured at its respective ends to operate within the cylinder 12. The lever 25 has a link member 27 rigidly secured to its outer end and a crank arm 28 that serves to connect the other end of the link 27 to the shaft 16 which is mechanically associated with the reversing drum shaft 3$^a$.

Referring now to Fig. 4, the figure illustrates the structure of the piston 23 that operates within cylinder 11 and is disposed nearer to the magnet valve 18. The piston stem 22$^a$, which is a continuation of the rack member 22, is provided, near its end, with a cylindrical washer member 30 and a plurality of piston rings 31, of a familiar type, which are secured to the stem 22$^a$ by means of a suitable coöperating nut and thread 32, the nut being adapted to enter the dished end (not shown) of the cylinder 11, so as not to interfere with the piston movement. A cup-shaped stop member 33 is also secured intermediate the piston rings 31 and the nut 32. It will be observed that, by varying the longitudinal dimensions of the stop member 33, as indicated by the dotted lines, the point in the cylinder 11 where the motion of the piston will be arrested or, in other words, the effective length of the piston stroke, may be readily regulated, thereby correspondingly varying the total angular throw of the mechanically associated main drum. Thus, main drums requiring different angular movements in the different forms of controllers may be readily operated in connection with the operating mechanism 5 by merely changing the length of the stop member 33.

The magnet valves 18, 19 and 20, under normal deënergized conditions, are adapted to prevent the admission of fluid-pressure to the corresponding cylinders and to connect the cylinders to the atmosphere, whereas the magnet valve 17 is of the opposite type which is adapted to admit fluid-pressure to the cylinder 11, when deënergized. It will be understood that the opposite action of the several valves occurs when they are respectively energized in any suitable manner. Inasmuch as the particular control system with which my apparatus is associated is not relevant to my present invention, no description thereof is deemed necessary here. A full exposition of a suitable control system for employing the apparatus hereinbefore described may be found in my co-pending application, Serial No. 796,867, filed October 23, 1913. It should be noted, however, that the valve magnets 17 and 18 are preferably controlled through the auxiliary drum 13, and the magnets 19 and 20, that correspond to the reversing drum of the controller, are energized through the auxiliary control drum 15, in accordance with familiar practice.

The magnet valve 18 comprises an operating coil 34 that is adapted to act upon a centrally-located, movable core 35, to the lower end of which a valve member 36 is secured, and is held in position by a suitable spring member 37 to prevent the access of fluid-pressure from an inlet 38 to a passage 39 that communicates with the cylinder 11. At the same time, an outlet 39ᵃ communicates with the cylinder 11 through the passage 39.

The opposite type of magnet valve 17 comprises an operating coil 40 that is adapted to actuate a core member 41, to the lower end of which a suitable valve member 42 is secured, and is biased in position by means of a suitable spring 43 to permit access of fluid pressure from an inlet 44 to a passage 45 that communicates with the cylinder 11. An outlet passage 46 is normally cut off from the passage 45 but communicates therewith when the magnet valve is energized.

It will be observed that the operating mechanism or head, as a whole, may be operatively mounted upon any one of various types of the well-known "K" controllers, with but slight modifications: namely, first, the length of the link member or bar 9 is varied in accordance with the distance between the centers of the reversing drum shaft 3ᵃ and of the auxiliary control drum shaft 16 when the main shafts 2ᵃ and 14 are alined, as indicated in Fig. 7, and secondly, the angular position of the crank-arm 7 of the reversing-drum with respect to the "off" position of the drum is varied in accordance with the desired angle of throw of the reversing drum from its central or "off" position by the link member 9.

I do not wish to be restricted to the structural details or arrangement of parts herein set forth, as modifications thereof may be made within the spirit and scope of my invention. I, therefore, desire that only such limitations shall be imposed as are indicated in the appended claims.

I claim as my invention:

1. The combination with a controller having a main drum and a reversing drum, of an independent incasing member disposed adjacent, and in spaced relation, to one end of said controller, a power-actuated controller-operating mechanism located within said incasing member and having rotatable members respectively corresponding to said drums, and dissimilar mechanical means disposed intermediate the adjacent bounding planes of said controller and said incasing member and adapted to operatively connect the respective drums to said corresponding rotatable members.

2. The combination with a controller having a main drum and a reversing drum, of a structurally independent controller-operating mechanism disposed adjacent, and in spaced relation, to one end of said controller and having rotatable members respectively corresponding, and extending substantially parallel, to said drums, a flexible coupling adapted to connect the main drum and the corresponding rotatable member of said operating mechanism, and a combination of crank-arms and links adapted to operatively connect the reversing drum to its said corresponding rotatable member, said coupling and said crank arms and links being interposed between said controller and said operating mechanism.

3. The combination with a controller having a main drum and a reversing drum, of a structurally independent controller-operating mechanism having a rotatable member extending substantially in alinement with, and mechanically connected to, the shaft of said main drum, and a second rotatable member disposed on the opposite side of the main drum from the reversing drum, and a set of mechanical members, including a link that crosses the main drum shaft, for operatively connecting said reversing drum to said second rotatable member.

4. The combination with a controller having a main drum and a reversing drum, and a top controller-cover member through which the shafts of said drums extend, of a structurally independent controller-operating mechanism inclosed controller-operating mechanism disposed adjacent, and in spaced relation, to said cover member and having rotatable members respectively corresponding to said drums, and mechanical means disposed substantially wholly within the longitudinal bounding planes of both the controller and the operating mechanism and intermediate said cover member and said operating mechanism for respectively connecting the said corresponding rotatable members to said main drum and said reversing drum shafts.

5. The combination with a controller having a main drum and a reversing drum, a top controller-cover member through which the shafts of said drums extend, and a structurally independent controller-operating mechanism having a rotatable member extending substantially in alinement with the shaft of said main drum, and a second rotatable member corresponding to the reversing drum and disposed on the opposite side of the main drum, of a flexible coupling adapted to connect said alined members, and a set of mechanical members for operating said reversing drum from said second rotatable member, said set comprising a plurality of crank arms respectively associated with said second rotatable member and said reversing drum shafts and a link that crosses the main drum shafts, the length of said link varying with the center distance between the main drum and the reversing drum and the angular position of the reversing-drum crank-arm relative to the "off" position of the drum varying with the total angular throw of the reversing drum, whereby said controller-operating mechanism may, with slight changes, be adapted for use with a plurality of different forms of controllers.

6. The combination with a controller having a main drum and a reversing drum, of an independent incasing member disposed adjacent, and in spaced relation, to one end of said controller, a controller-operating mechanism located within said incasing member and having rotatable members respectively corresponding to said drums, and sets of mechanical means located within the space between said controller and said incasing member for connecting said rotatable members with the corresponding drums, one of said sets being capable of ready variation to permit of different total angular throws of the corresponding drum.

7. The combination with a controller having a main drum and a reversing drum, of a structurally independent controller-operating mechanism having rotatable members respectively corresponding, and operatively connected, to said drums, a plurality of fluid-pressure-actuated pistons and of coöperating cylinders for respectively actuating said rotatable members, and variable means adapted to be associated with one of said pistons to permit of different total angular throws of the corresponding rotatable member.

8. The combination with a controller having a main drum and a reversing drum, of a structurally independent controller-operating mechanism having rotatable members respectively corresponding to said drums, the main drum shaft and the corresponding rotatable member being substantially in alinement, a coupling for said alined members, a combination of crank-arms and links adapted to operatively connect the reversing drum to its said corresponding rotatable member, a plurality of fluid-pressure-actuated pistons and coöperating cylinders for respectively actuating said rotatable members, and a stop member adapted to fix the length of stroke of the piston corresponding to the main drum, the length of said stop member determining the total angular throw of the main drum.

9. An operating mechanism for drum controllers comprising a rotatable member, a fluid-pressure-actuated piston and a coöperating cylinder for actuating said rotatable member, and a removable cup-shaped stop member longitudinally disposed upon one end of said piston, the length of said stop member determining the length of piston stroke together with the total angular throw of said rotatable member.

10. The combination with a controller having a main drum and a reversing drum, of an independent incasing member disposed adjacent, and in spaced relation, to one end of said controller, a controller-operating device located within said incasing member and comprising rotatable auxiliary control drums respectively alined with and extending substantially parallel to, the main and the reversing drums, a plurality of electrically-controlled fluid-pressure-actuated pistons and coöperating cylinders for respectively actuating said auxiliary control drums, and dissimilar mechanical transmission members disposed and operable entirely within the space between the controller and the incasing member for connecting the auxiliary drums to the respectively corresponding main and reversing drums.

11. The combination with a controller having a main drum and a reversing drum, of a structurally independent controller-operating mechanism having a rotatable auxiliary control drum extending substantially in alinement with, and mechanically connected to, the shaft of said main drum, a combination of crank-arms and links adapted to operatively connect the reversing drum and the corresponding auxiliary control drum, a plurality of fluid-pressure actuated pistons and coöperating cylinders for respectively actuating said auxiliary control drums.

12. The combination with a controller having a main drum and a reversing drum, of structurally independent controller-operating mechanism disposed, as a whole, in substantially symmetrical relation to said controller and having rotatable auxiliary control drums respectively corresponding to the main and the reversing drums, a plurality of fluid-pressure actuated pistons and of coöperating cylinders for respectively actuating said auxiliary control drums, electrically-controlled valves for governing the admission of fluid-pressure to said cylinders, a coupling for connecting the main drum and the corresponding auxiliary control drum, and a combination of crank-arms and links for operatively connecting said reversing drum to the corresponding auxiliary control drum.

13. The combination with a controller having a main drum and a reversing drum, and a top controller-cover member through which the shafts of said drums extend, of a structurally independent controller-operating mechanism having an auxiliary control drum extending substantially in alinement with, and mechanically connected to, the shaft of said main drum, a second auxiliary control drum corresponding to the reversing drum and disposed on the opposite side of the main drum shaft, a plurality of fluid-pressure actuated pistons and of coöperating cylinders for respectively actuating said auxiliary control drums, a plurality of valves electrically-controlled through the corresponding auxiliary control drums for governing the admission of fluid-pressure to said cylinders, an interchangeable stop member longitudinally disposed upon one end of the piston corresponding to the main drum, the length of said stop member determining the total angular throw of said main drum, and a set of mechanical members for operating said reversing drum from said second auxiliary control drum, said set comprising a plurality of crank arms respectively associated with said second auxiliary drum and said reversing drum and a link that crosses the main drum shaft, the length of said link varying with the center distance between the main drum and the reversing drum, and the angular position of the reversing drum crank-arms relative to the "off" position of the drum varying with the total angular throw of the reversing drum, whereby said controller-operating mechanism may, with slight mechanical changes, be adapted for use with a plurality of controllers having different forms of main and reversing drums.

14. The combination with a controller having a main drum and a reversing drum, of an independent incasing member disposed adjacent, and in spaced relation, to one end of said controller, a controller-operating mechanism located within said incasing member and having rotatable members extending substantially parallel to said drums, a coupling for connecting one of said drums and one of said rotatable members in coaxial alinement, and a linkage mechanism for operatively connecting the other drum and its corresponding rotatable member, said coupling and said linkage mechanism being interposed wholly within the space between said controller and said incasing member.

15. The combination with a controller having a plurality of rotatable drums, of a power-actuated operating mechanism in spaced relation to said controller and having a rotatable member disposed in coaxial alinement with the shaft of one of said drums and coupled thereto and a second rotatable member disposed in offset relation to the other drum, and mechanical means, including a link, that crosses the first drum shaft for associating said second drum with said second rotatable member.

16. The combination with a controller having a plurality of drums, and shafts upon which the drums are mounted, of an independent operating mechanism therefor having a rotatable member extending substantially in alinement with, and mechanically connected to, the shaft of one of said drums, and a second rotatable member corresponding to the other drum, a plurality of crank-arms respectively associated with said second rotatable member and the shaft of said second drum and a link for connecting said crank-arms, the angular position of the crank-arm of said second drum, relative to the "off" position of said drum, determining the total angular throw thereof.

17. The combination with a controller comprising a plurality of drums, an independent power-operated mechanism therefor having a rotatable member in substantial alinement with the shaft of one of said drums and a second rotatable member corresponding to the second drum and disposed on the opposite side of said first drum, and a coupling connecting said alined members, of mechanical means for operating said second drum from said second rotatable member, said means comprising a plurality of crank-arms respectively associated with said second rotatable member and the shaft of said second drum and a link that crosses the shaft of the first drum, the length of said link varying with the center distance between the first drum and the second drum, and the angular position of the second drum crank-arm, relative to the "off" position of said drum, varying with the total angular throw of the second drum.

18. The combination with a controller having a rotatable drum, an independent power-operated mechanism therefor having a rotatable member in substantial alinement with said drum, a cylinder and coöperating movable piston, and a coupling for said alined members, of a stop member associated with said piston for determining its length of stroke and the total angular throw of said drum.

19. The combination with a controller having a plurality of main drums, of an independent operating-mechanism therefor having a plurality of corresponding auxiliary control drums one of which extends substantially in alinement with one of said main drums and, coupled thereto, and a combination of crank-arms and links for connecting the second main drum and the second auxiliary control drum, and a plurality of fluid-actuated devices for actuating said auxiliary control drums.

20. The combination with a controller having a plurality of drums, and an independent operating-mechanism therefor disposed, as a whole, in substantially symmetrical relation to said controller and having rotatable auxiliary control drums respectively corresponding to said main drums, of a plurality of fluid-actuated pistons and coöperating cylinders for respectively actuating said control drums, electrically operated valves for governing the admission of operating fluid to said cylinders, a coupling between one of said main drums and the corresponding auxiliary control drum and a mechanical linkage for connecting the other main drum and auxiliary control drum.

21. The combination with a controller comprising a plurality of rotatable drums, disposed in parallel relation, and an operating mechanism therefor disposed adjacent, and in spaced relation to, one end of said controller and comprising a pair of fluid-actuated operating devices, of mechanical means disposed intermediate said controller and said operating mechanism for associating the respective fluid-actuated operating devices with said controller drums, and means associated with said controller and said operating mechanisms for adapting said mechanism for operation with controllers of different sizes and different total angular throws.

In testimony whereof, I have hereunto subscribed my name this 7th day of Oct., 1914.

ARTHUR J. HALL.

Witnesses:
G. R. FUVIER,
B. B. HINES.

Copies of this patent may be obtained for five cents each, by addressing the "Commissioner of Patents, Washington, D. C."